US010965692B2

(12) United States Patent
Philip et al.

(10) Patent No.: US 10,965,692 B2
(45) Date of Patent: Mar. 30, 2021

(54) SYSTEM FOR PROCESSING QUERIES USING AN INTERACTIVE AGENT SERVER

(71) Applicant: Bank of America Corporation, Charlotte, NC (US)

(72) Inventors: Charles Chandy Philip, Mumbai (IN); Jaya Prakash Pulavarti, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 204 days.

(21) Appl. No.: 15/948,518

(22) Filed: Apr. 9, 2018

(65) Prior Publication Data

US 2019/0312889 A1    Oct. 10, 2019

(51) Int. Cl.
| H04L 29/06 | (2006.01) |
| H04L 12/24 | (2006.01) |
| G06F 16/9535 | (2019.01) |
| G06F 40/205 | (2020.01) |
| G06F 40/263 | (2020.01) |

(52) U.S. Cl.
CPC ...... *H04L 63/1416* (2013.01); *G06F 16/9535* (2019.01); *G06F 40/205* (2020.01); *G06F 40/263* (2020.01); *H04L 41/046* (2013.01); *H04L 63/1433* (2013.01)

(58) Field of Classification Search
CPC ..... H04L 9/00; H04L 63/1416; H04L 63/046; H04L 63/1433; H04W 12/00; G06Q 10/00; G06F 40/205; G06F 40/263
See application file for complete search history.

(56) References Cited

U.S. PATENT DOCUMENTS

| 8,250,192 B2 | 8/2012 | Bowerman |
| 8,639,638 B2 | 1/2014 | Shae et al. |
| 8,738,739 B2 | 5/2014 | Makar et al. |
| 9,794,199 B2 | 10/2017 | Capper et al. |
| 2002/0052871 A1* | 5/2002 | Chang ................. G06F 16/3344 |
| 2012/0254333 A1* | 10/2012 | Chandramouli ........ G06F 17/27 709/206 |
| 2017/0180284 A1 | 6/2017 | Smullen et al. |

* cited by examiner

*Primary Examiner* — Joseph P Hirl
*Assistant Examiner* — Leynna Truvan
(74) *Attorney, Agent, or Firm* — Michael A. Springs

(57) ABSTRACT

A system for processing queries is disclosed. The system is configured to receive a query from a user, the query comprising a message indicating a request for a service. The system then performs natural language processing on the query, and identifies keywords of the query based on the natural language processing. Based on the identified keywords, the system determines an action and an actionable item from the query. Then, the system generates an acknowledgement request for the query based on the determined action and actionable item, and sends the acknowledgement request to the user. After receiving an acknowledgement from the user on the acknowledgement request, the system sends the determined action and actionable item to an upstream server to request the service.

20 Claims, 4 Drawing Sheets

User 1:
  "make reinstat internet access"
Interactive agent server:
  "Please confirm on the suggested sentence:
  reinstate internet access
  Continue? (Oaky)"

User1:
  "Okay crap" ----> Profanity
Interactive agent server:
  "Ignored because of profanity. You are being monitored for profanity violation."

*FIG. 4A*

User 1:
  "make reinstat internet access"
Interactive agent server:
  "Please confirm on the suggested sentence:
  reinstate internet access
  Continue? (Oaky)"

User1 ----> Gibberish
  "asdflkhl"
Interactive agent server:
  "Confirmation unintelligible. Please send an intelligible confirmation."

*FIG. 4B*

Interactive agent server:
  "Have you tried to reset your password?
  Continue? (Yes)"

User1: ----> Non-English
  "Yes ha ha ha aha"
Interactive agent server:
  "Non-English language detected. Please resend confirmation in English."

*FIG. 4C*

SYSTEM FOR PROCESSING QUERIES USING AN INTERACTIVE AGENT SERVER

TECHNICAL FIELD

This disclosure relates generally to processing queries, and more particularly to processing queries using an interactive agent server.

BACKGROUND

An enterprise may face many network security issues such as cyber-attack and security breach. Under such circumstances, security vulnerabilities in the network may compromise the security of data stored by the enterprise.

If these security issues or other vulnerabilities are not resolved in a timely manner, a backlog of the security issues or vulnerabilities may cause a bottleneck in the network. This will lead to the security vulnerabilities being exploited. Therefore, it is desirable to find a way to efficiently resolve the security issues and other vulnerabilities in the network.

SUMMARY

An enterprise may face many network security issues such as security events including cyber-attacks, security breaches, etc. For example, a malicious actor may attempt to log into a user account at an IP address different from where the user usually logs into the user account. Under such circumstances, security vulnerabilities in the network may compromise the security of data stored by the enterprise. The enterprise may also receive security-related queries (e.g., reset password; request database access; request URL access) in a large volume from users. If these security events and/or security-related queries are not resolved in a timely manner, a backlog of the security events and/or security-related queries may cause a bottleneck in the network. This will lead to the security vulnerabilities being exploited. Therefore, these security events and/or security-related queries create a technical problem that is inherently rooted in a computer network.

The present application discloses a system which provides a technical solution to efficiently resolving the security events and/or security-related queries.

For example, a user may want to request a network-associated service from the system, such as requesting database access for a cloud database. Sometimes the user may send a query to the system containing typos, profanity language, or unintelligible language. The system may determine what the user is actually requesting and send an acknowledgement request to request the user to acknowledge that the user wants to access the cloud database.

Specifically, in some embodiments, the disclosed system receives a query from a user. For example, the query may comprise a message indicating a request for a service. The system then performs natural language processing on the query, and identifies keywords of the query based on the natural language processing. Based on the identified keywords, the system determines an action and an actionable item from the query. The action may comprise an operation, a procedure, or a process and the actionable item may comprise an item that is impacted by the action. Then, the system generates an acknowledgement request for the query based on the determined action and actionable item, and sends the acknowledgement request to the user. The acknowledgement request requests the user to acknowledge that the user is requesting the service. In some embodiments, the acknowledgement request comprises the determined action and actionable item. After receiving an acknowledgement from the user on the acknowledgement request, the system sends the determined action and actionable item to an upstream server to request the service.

In some embodiments, the system determines whether the received acknowledgement comprises profanity, unintelligible language (e.g., gibberish), and/or non-English language.

If the system determines that the received acknowledgement comprises profanity, the system notifies the user that the received acknowledgement is ignored because of profanity and that the user is being monitored for profanity.

If the system determines that the received acknowledgement comprises unintelligible language, the system requests the user to send an intelligible acknowledgement.

If the system determines that the received acknowledgement comprises non-English language, the system requests the user to send an acknowledgement in English.

As another example, a malicious actor or a user may have attempted to reset a password for a user account at an IP address different from where the user usually logs into the user account. The system may flag this action as a network security issue by recording a security event indicating that someone has attempted to reset the password for the user account at an unusual IP address. The system may request the user to acknowledge that the user has attempted to reset the password.

Specifically, in some embodiments, the system retrieves a security event associated with a user. The security event indicates that the user attempted to perform a security-related action (e.g., access database, reset password). Then, the system generates an acknowledgement request which requests the user to acknowledge that the user has attempted to perform the security-related action.

The disclosed system performs natural language processing on the query to facilitate resolving the queries in a timely manner. It improves the accuracy of query interpretation by parsing the query and identifying keywords, thereby avoiding misinterpreting the query. Misinterpreting the query leads to wasted computing time on processing the misinterpreted query and unwanted service to the user. Therefore, the disclosed system and solution improve the efficiency of query processing, and facilitates conserving computing times and computing resources such as bandwidth and memory. By processing the queries more efficiently, the system is able to resolve the queries in a timely manner, thereby avoiding accumulating the queries in the network and resolving the bottleneck in the network.

By performing natural language processing on the queries, the system is providing an unconventional solution to the previously discussed problem. Conventional systems do not perform natural language processing on queries. This may result in misinterpretation of the queries, which leads to wasted computing time on processing the misinterpreted query and unwanted service to the user.

Furthermore, the disclosed system and solution improves the security of the network and the operation of the network itself. As discussed previously, the system is able to resolve the queries in a timely manner, thereby avoiding accumulating the queries in the network and reducing network congestion. This facilitates resolving the bottleneck in the network and increasing the robustness of the network. For example, it may restore or improve the bandwidth of the network. Further, bottleneck in the network may cause delay in network security protocol's response to security events. Resolving the bottleneck in the network helps reduce the network security protocol's response time to security events, thereby improving the security of the network.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which:

FIG. 4A illustrates an exemplary embodiment of a communication between a user and an interactive agent server, according to some embodiments of the present disclosure;

FIG. 4B illustrates an exemplary embodiment of another communication between a user and an interactive agent server, according to some embodiments of the present disclosure; and FIG. 4C illustrates an exemplary embodiment of another communication between a user and an interactive agent server, according to some embodiments of the present disclosure.

DETAILED DESCRIPTION

Figure 1:
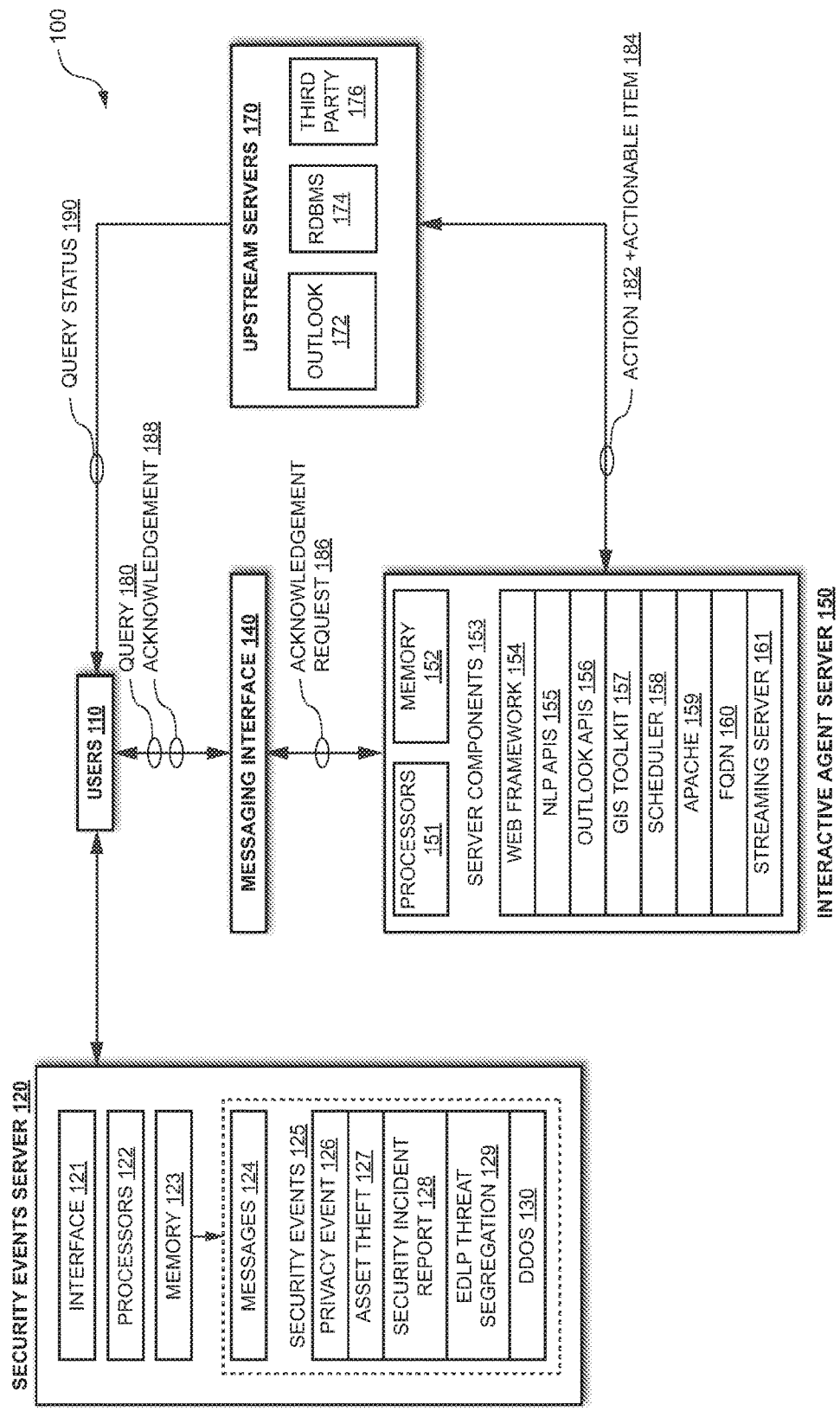
FIG. 1 illustrates an exemplary embodiment of a system for processing queries, according to some embodiments of the present disclosure.

FIG. 1 illustrates an exemplary embodiment of a system 100 for processing queries, according to certain embodiments of the present disclosure. System 100 comprises one or more users 110, a security events server 120, a messaging interface 140, an interactive agent server 150, and one or more upstream servers 170. In general, system 100 receives a query 180 for a service from a user 110 at interactive agent server 150 via messaging interface 140, performs natural language processing on the query 180, generates an acknowledgement request 186, and send it to user 110. After user 110 sends back an acknowledgment 188, system 100 requests the service from upstream server 170. Alternatively, system 100 may retrieve a security event 125 stored in security events server 120, and use interactive agent server 150 to process the security event 125.

Users 110 of system 100 may include businesses or other commercial organizations, government agencies, individuals, or any other suitable users.

Security events server 120 is configured to maintain security events 125 associated with users 110 and messages 124 received from users 110. Security events server 120 may comprise any suitable storage scheme. For example, security events server 120 may comprise any software, hardware, firmware, and/or combination thereof capable of storing information. Exemplary security events server 120 comprises individual data storage devices (e.g., disks, solid-state drives), which may be part of individual storage engines and/or may be separate entities coupled to storage engines within. In some embodiments, security events server 120 may store third-party databases, database management systems, a file system, and/or other entities that include or that manage data repositories. Security events server 120 may be locally located or remotely located to other elements of system 100.

In some embodiments as illustrated, security events server 120 includes an interface 121, one or more processors 122, and a memory 123. Security events server 120 stores the messages 124 and security events 125 in memory 123. Messages 124 include any message scheme including, but not limited to, instant message, text message, video messages, email, voicemail, or fax. In some embodiments as illustrated, security events 125 include, but not limited to, privacy events 126 (e.g., reset password, access database), asset thefts 127, security incident reports (SIRs) 128, endpoint data loss prevention (eDLP) threat aggregation 129, and distributed denial of service (DDoS) attacks 130.

For example, user 110 may want to reset a password for a user account using a computer having an IP address that is different from where user 110 usually logs into the user account. Then, system 100 records a security event 125 indicating that user 110 has attempted to reset password at an unusual IP address, and stores the security event 125 in security events server 120.

As another example, user 110 wants to reset password for a user account. User 110 may send a message 124 (e.g., an email) to system 100 indicating that user 110 wants to reset password for the user account. System 100 then stores the email 124 in security event server 120.

Messaging interface 140 is configured to support communication between users 110 and interactive agent server 150. Messaging interface 140 includes any device operable to receive input, send output, process the input or output, or perform other suitable operations for system 100. Messaging interface 140 includes any port or connection, real or virtual, including any suitable hardware or software having protocol conversion and data processing capabilities. In certain embodiments, messaging interface 140 includes a user interface (e.g., physical input, graphical user interface ("GUI"), touchscreen, buttons, switches, transducer, or any other suitable method to receive input from a user).

In some embodiments, messaging interface 140 is configured to support text-based communication. In some embodiments, messaging interface 140 is configured to support voice-based communication. Yet in other embodiments, messaging interface 140 is further configured to support any other appropriate type of communication.

Interactive agent server 150 is configured to handle queries associated with users 110. In some embodiments as illustrated, interactive agent server 150 includes one or more processors 151, a memory 152, and one or more server components 153. As illustrated, server components 153 include, but not limited to, web framework 154, NLP application programing interfaces (APIs) 155, OUTLOOK APIs 156, geographic information system (GIS) toolkits 157, scheduler 158, APACHE 159, fully qualified domain name (FQDN) 160, and streaming server 161.

In some embodiments, web framework 154 of interactive agent server 150 is configured to support the development of web applications of interactive agent server 150, including web services, web resources, and web APIs. For example, web framework 154 of interactive agent server 150 provides tools and libraries to support web development tasks, including routing URLs to appropriate handlers, interacting with databases, supporting sessions and user authorization, formatting output (e.g., HTML, JSON, XML), and improving security against web attacks.

NLP APIs 155 are configured to analyze, understand, and derive meaning from human languages. For example, NLP APIs 155 provide tools and libraries to perform tasks such as automatic summarization, translation, named entity recognition, relationship extraction, sentiment analysis, speech recognition, and topic segmentation. In some embodiments, interactive agent server 150 receives a query from user 110. Interactive agent server 150 may perform natural language processing on the query using the NLP API 155, and determines an action and an actionable item from the query. In some embodiments, interactive agent server 150 receives an email 124 associated with user 110 from security events server 120. Interactive agent server 150 may perform natural language processing on the content of the email using the NLP APIs, and extracts a query from the email based on the natural language processing.

OUTLOOK APIs 156 are configured to support personal information management. For example, OUTLOOK APIs 156 may include tools and libraries to support calendar planning, task managing, contact managing, note taking, journal, and web browsing. GIS toolkits 157 provide tools and libraries to capture, store, manipulate, analyze, manage, and present spatial or geographic data (e.g., digital maps and georeferenced data). Scheduler 158 is configured to coordinate the execution of different tasks and administrate available sources in interactive agent server 150. APACHE 159 includes tools and libraries to support secure and efficient web applications and services. FQDN 160 includes an absolute domain name of interactive agent server 150, and/or absolute domain names of other elements of system 100. Streaming server 161 is configured to support transferring of data at a steady high-speed rate within system 100. Streaming server 161 facilitates improving bandwidth sufficiency and reducing time lag in system 100.

Upstream servers 170 are configured to provide service to another server (e.g., interactive agent server 150). In some embodiments as illustrated, upstream servers 170 include, but not limited to, OUTLOOK server 171, relational database management systems (RDBMS) 172, and third party servers 173. OUTLOOK server 171 may store user or user-related information, such as users' web mails, contacts, tasks, and calendaring services. RDBMS 172 may store personal data, financial records, manufacturing and logistical information, and/or other applications. Exemplary third party servers 173 include validation server, internet service provider server, and web server. For example, validation server may validate user identities, and internet provider server may provide internet service to users 110.

In operation, system 100 may be configured to work in two modes: (1) user initiated work mode; and (2) server initiated work mode.

In the user initiated work mode, a user 110 sends a query 180 to interactive agent server 150 via messaging interface 140. In some embodiments, the query 180 includes a message indicating a request for a service associated with the network. For example, the message may indicate that user 110 wants to reinstate internet access for a private network. The message may indicate that user 110 wants to decommission database access for a cloud database. The message may indicate that user 110 wants to revoke URL access for a particular website. Interactive agent server 150 then performs natural language processing (NLP) on the query 180, and identifies keywords of the query 180. Based on the identified keywords, interactive agent server 150 determines an action 182 and an actionable item 184 from the query 180. In some embodiments, the action 182 includes an operation, a procedure, or a process, and the actionable item 184 includes an item that is impacted by the action 182. Then, interactive agent server 150 generates an acknowledgement request 186 for the query 180 based on the determined action 182 and actionable item 184, and sends the acknowledgement request 186 to user 110. In some embodiment, the acknowledgement request 186 requests user 110 to acknowledge that user 110 is requesting the service. In some embodiments, the acknowledgement request 186 comprises the determined action 182 and actionable item 184. After receiving an acknowledgement 188 from user 110 on the acknowledgement request 186, interactive agent server 150 sends the determined action 182 and actionable item 184 to an upstream server 170 to request the service.

In some embodiments, interactive agent server 150 determines whether the received acknowledgement 188 comprises profanity, unintelligible language (e.g., gibberish), and/or non-English language.

In some embodiments, if interactive agent server 150 determines that the received acknowledgement 188 comprises profanity, the system 100 notifies user 110 that the received acknowledgement 188 is ignored because of profanity and that user 110 is being monitored for profanity.

In some embodiments, if interactive agent server 150 determines that the received acknowledgement 188 comprises unintelligible language, the system 100 requests user 110 to send an intelligible acknowledgement.

In some embodiments, if interactive agent server 150 determines that the received acknowledgement 188 comprises non-English language, the system 100 requests user 110 to send an acknowledgement in English.

In the server initiated work mode, security events server 120 retrieves a security event 125 associated with a user 110, and sends security event 125 to interactive agent server 150. In some embodiments, the security event 125 indicates that the user 110 attempted to perform a security-related action (e.g., reset password). Then, interactive agent server 150 generates an acknowledgement request 186 which requests the user 110 to acknowledge that the user 110 has attempted to perform the security-related action.

System 100 may further comprise any other suitable type and/or number of network devices (not shown). Example of other network devices include, but are not limited to, web clients, web servers, user devices, mobile phones, computers, tablet computers, laptop computers, software as a service (SaaS) servers, databases, file repositories, file hosting servers, and/or any other suitable type of network device. System 100 may be configured as shown or in any other suitable configuration. Modifications, additions, or omissions may be made to system 100. System 100 may include more, fewer, or other components. Any suitable component of system 100 may include a processor, interface, logic, memory, or other suitable element.

A server described in the present disclosure may include hardware, software, or other server(s). A server may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of a server may be performed by any suitable combination of one or more servers or other elements at one or more locations.

A processor described in the present disclosure may comprise any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor may be a programmable logic device, a microcontroller, a microprocessor, or any suitable combination of the preceding. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

A memory described in the present disclosure may comprise any device operable to store, either permanently or temporarily, data, operational software, or other information for a processor. In some embodiments, the memory comprises one or more disks, tape drives, or solid-state drives, and may be used as an over-flow data storage device, to store programs when such programs are selected for execution, and to store instructions and data that are read during program execution. The memory may comprise any one or a combination of volatile or non-volatile local or remote devices suitable for storing information. For example, the memory may comprise random access memory (RAM), read only memory (ROM), magnetic storage devices, optical storage devices, semiconductor storage devices, or any other suitable information storage device or a combination of these devices.

An interface described in the present disclosure may comprise any device operable to receive input, send output, process the input or output, or perform other suitable operations for system 100. The interface includes any port or connection, real or virtual, including any suitable hardware or software, including protocol conversion and data processing capabilities, to communicate through a network. In certain embodiments, an interface includes a user interface (e.g., physical input, graphical user interface ("GUI"), touchscreen, buttons, switches, transducer, or any other suitable method to receive input from a user).

Figure 2:
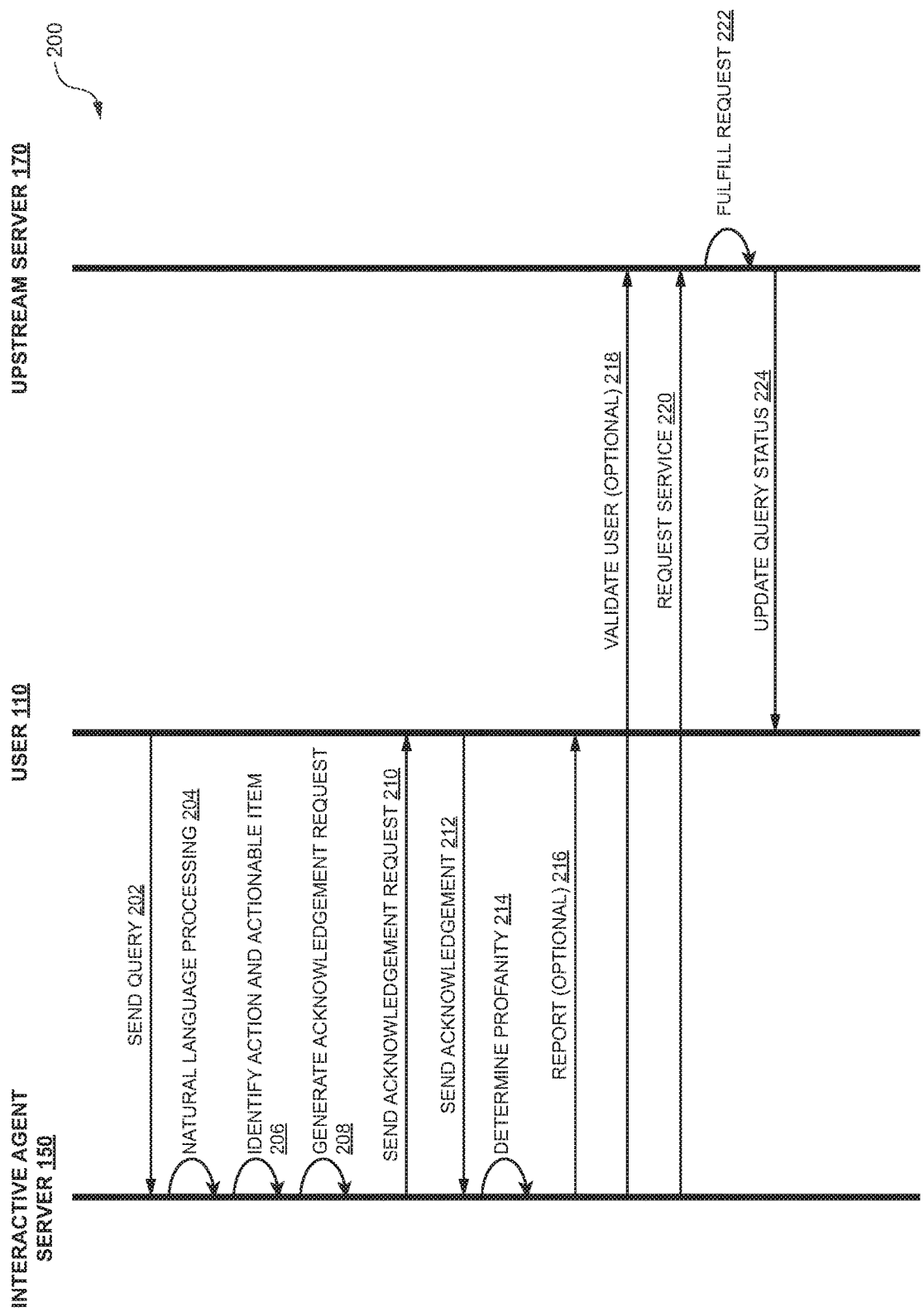
FIG. 2 presents a call graph illustrating an exemplary embodiment of a method of processing queries, according to some embodiments of the present disclosure.

FIG. 2 presents a call graph illustrating an exemplary embodiment of a method 200 of processing queries 180, according to some embodiments of the present disclosure. The following is a non-limiting example that illustrates how system 100 implements method 200. Method 200 can be best understood with reference to FIGS. 4A, 4B, and 4C.

First, user 110 initiates a conversation with interactive agent server 150 by sending a query 180 to interactive agent server 150 (step 202). In some embodiments, the query 180 includes a message indicating a request for a service. For example, referring to FIG. 4A, user 110 sends the message "make reinstat internet access" to interactive agent server 150, indicating that user 100 wants to restore internet access. Note that user 110 has misspelled the word "reinstate" as "reinstat" in the message.

Interactive agent server 150 receives the message and performs natural language processing on the message (step 204). In some embodiments, interactive agent server 150 may use NLP APIs to parse the sentences in the message, segment words in the sentences, perform semantic analysis on the words, and extract terminologies, etc.

In some embodiments, interactive agent server 150 identifies some keywords of the message. Specifically, interactive agent server 150 may first perform pre-processing on the sentences in the message. For example, interactive agent server 150 may remove words that aren't alphanumeric. Interactive agent server 150 may filter out meaningless words and/or phrases such as stop words. Interactive agent server 150 may determine negations in the message. Interactive agent server 150 may further correct words that are spelled wrong in the message. Then, interactive agent serve 150 may identify verbs and nouns as keywords in the message. Interactive agent server 150 may categorize the verbs and nouns, and determine an action 182 and an actionable item 184 (step 206). In some embodiments, actions 182 refer to tasks such as operations, processes, or procedures initiated by interactive agent serve 150. Actionable items 184 provide a selection of things impacted by the actions. Exemplary actions 182 include "revoke," "reinstate," and "decommission." Exemplary actionable items 184 include "internet access," "URL access," "database access," and "ID card access."

For example, interactive agent server 150 performs natural language processing on the message "make reinstat internet access" as illustrated in FIG. 4A. Interactive agent server 150 removes the word "make," corrects the word "reinstat" to "reinstate," and determines the word "reinstate" as an action 182 and the term "internet access" as an actionable item 184.

Interactive agent server 150 then generates an acknowledgement request 186 for the message (step 208). In some embodiments, interactive agent server 150 generates the acknowledgement request based on the determined action 182 and actionable item 184. As illustrated in FIG. 4A, interactive agent server 150 generates the acknowledgement request 186 as "reinstate internet access," which includes the determined action 182 "reinstate" and the determined actionable item 184 "internet access." Interactive agent server 150 then sends the acknowledgement request 186 to user 110 via messaging interface 140 to request user 110 to acknowledge the acknowledgement request 186 (step 210).

Next, user 110 sends an acknowledgement 188 on the acknowledgement request 186 to interactive agent server 150 via messaging interface 140 (step 212). In some embodiments, interactive agent server 150 receives the acknowledgment 188 and determines whether the received acknowledgement 188 comprises profanity (step 214). Exemplary profanity includes bad language, offensive language, crude language, and blasphemous language. Yet in other embodiments, interactive agent server 150 further determines whether the received acknowledgement 188 comprises unintelligible language (e.g., gibberish), and/or non-English language.

In some embodiments, interactive agent server 150 performs natural language processing on the acknowledgment 188 and determines whether the acknowledgement 188 comprises profanity, unintelligible language (e.g., gibberish), and/or non-English language.

If interactive agent server 150 determines that the received acknowledgement 188 comprises profanity, interactive agent server 150 notifies the user 110 that the received acknowledgement 188 is ignored because of profanity and that the user 110 is being monitored for profanity (step 216). For example, as illustrated in FIG. 4A, after determining that the acknowledgement 188 includes profanity, interactive agent server 150 sends a notification to user 110 informing user 110 of being monitored for profanity violation.

If interactive agent server 150 determines that the received acknowledgement 188 comprises unintelligible language (e.g., gibberish), interactive agent server 150 requests the user 110 to send an intelligible acknowledgement. As illustrated in FIG. 4B, after determining that the acknowledgement 188 contains gibberish, interactive agent server 150 sends a notification to user 110 requiring user 100 to send an intelligible acknowledgement.

If interactive agent server 150 determines that the received acknowledgement 188 comprises non-English language, interactive agent server 150 requests the user 110 to resend the acknowledgement 188 in English. As illustrated in FIG. 4C, interactive agent server 150 sends a notification to user 110 to inform the user 110 that the acknowledgement 188 contains non-English language and to require user 110 to resend the acknowledgement 188 in English.

If interactive agent server 150 determines that the acknowledgement 188 does not contain profanity, unintelligible language, and/or non-English language, interactive agent server 150 sends the determined action 182 and actionable item 184 to an upstream server 170 (step 220). For example, interactive agent server 150 sends the determined action 182 "reinstate" and the determined actionable item 184 "internet access" to a third party 176 (e.g., an internet service provider) to restore internet access. Note that in some embodiments, interactive agent server 150 may further requests upstream server 170 to validate the identity of user 110 (step 218).

Upstream server 170 receives the determined action 182 and actionable item 184 from interactive agent server 150 and fulfills the requested service (step 222). For example, third party 176 (e.g., an internet service provider) receives the action 182 "reinstate" and the actionable item 184 "internet access" from interactive agent server 150, and restores internet access for the user 110.

In some embodiments, upstream server 170 further updates the query status 190 to the user 110 (step 224). For example, upstream server 170 may send a notification to user 110 informing user 110 that internet access has been reinstated.

Figure 3:
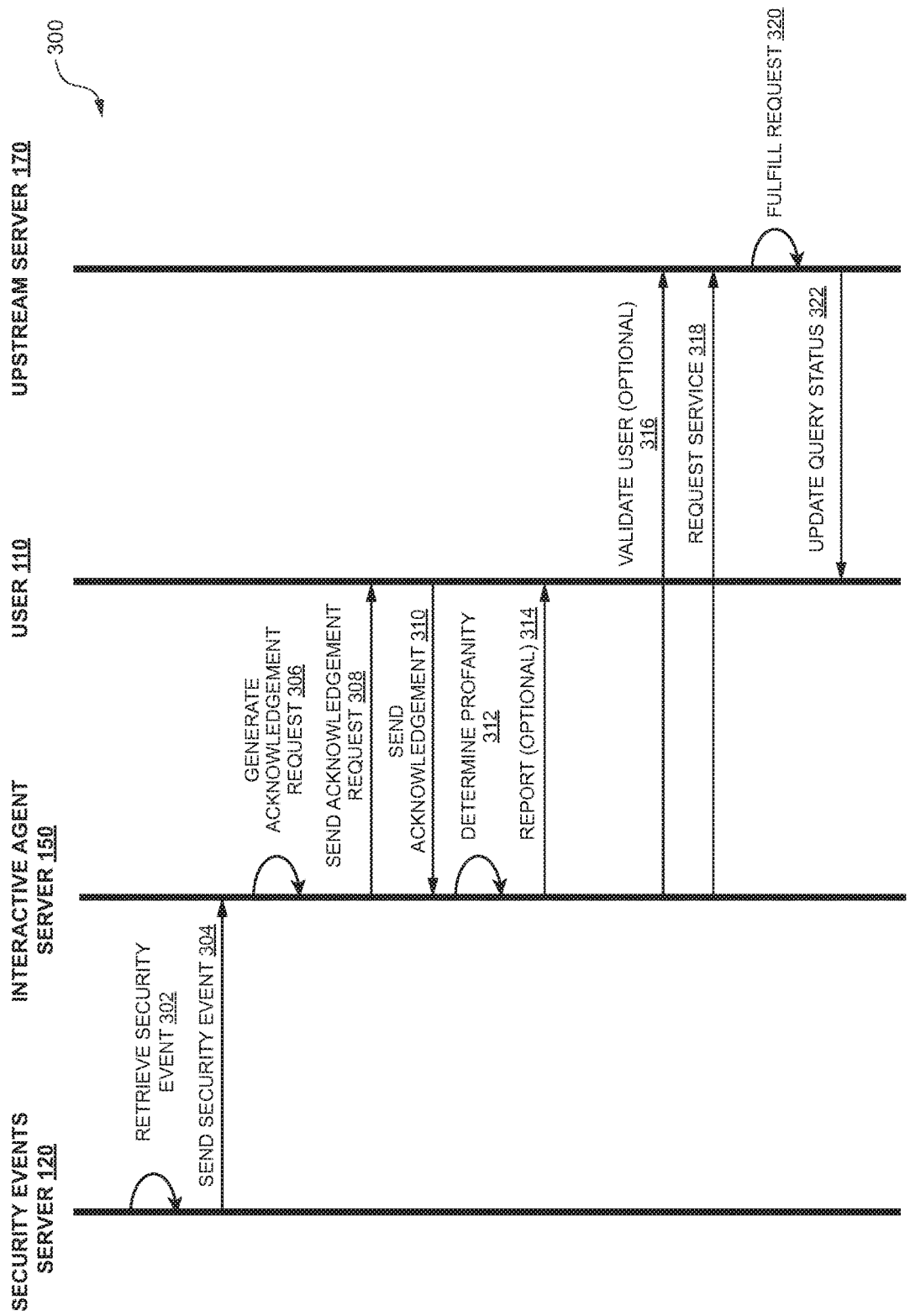
FIG. 3 presents a call graph illustrating an exemplary embodiment of a method of processing queries, according to some embodiments of the present disclosure.

FIG. 3 presents a call graph illustrating an exemplary embodiment of a method 300 of processing queries 180, according to some embodiments. The following is a non-limiting example that illustrates how system 100 implements method 300.

First, security events server 120 retrieves a security event 125 (step 302). For example, user 110 may want to reset a password for a user account using a computer having an IP address that is different from where user 110 usually logs into the user account. Security events server 120 records a security event 125 indicating that user 110 has attempted to reset password at an unusual IP address. In some embodiments, the security event 125 may further indicate that the user account has been locked from the user 110.

Alternatively, in some embodiments, security events server 120 retrieves a message 124 (e.g., an email) associated with a user 110 indicating that 110 wants to reset password for a user account.

Then, security events server 120 sends the retrieved security event 125 or the retrieved message 124 to interactive agent server 150 (step 304).

Interactive agent server 150 receives the security event 125 sent from security events server 120, and generate an acknowledgement request 186 for the security event 125 (step 306). For example, referring to FIG. 4C, after receiving the security event 125 indicating that user 110 has attempted to reset password at an unusual IP address, interactive agent server 150 generates an acknowledgement request 186 which requests the user 110 to acknowledge that the user 110 has attempted to reset password.

Alternatively, in some embodiments, interactive agent server 150 may receive a message 124 (e.g., an email) from security events server 120. For example, the email 124 may be pertaining to resetting password for a user account. In some embodiments, interactive agent server 150 uses NPL APIs 155 to perform natural language processing on the email 124 to generate an acknowledgement request 186.

Next, interactive agent server 150 sends the acknowledgement request 186 to user 110 (step 308).

User 110 then sends an acknowledgement 188 on the acknowledgement request 186 to interactive agent server 150 via messaging interface 140 (step 310).

In some embodiments, interactive agent server 150 receives the acknowledgment 188 and determines whether the received acknowledgement 188 comprises profanity (step 312). Yet in other embodiments, interactive agent server 150 further determines whether the received acknowledgement 188 comprises unintelligible language (e.g., gibberish), and/or non-English language.

In some embodiments, interactive agent server 150 performs natural language processing on the acknowledgment 188 and determines whether the acknowledgement 188 comprises profanity, unintelligible language (e.g., gibberish), and/or non-English language.

In some embodiments, if interactive agent server 150 determines that the received acknowledgement 188 comprises profanity, interactive agent server 150 notifies the user 110 that the received acknowledgement 188 is ignored because of profanity and that the user 110 is being monitored for profanity (step 314). In some embodiments, if interactive agent server 150 determines that the received acknowledgement 188 comprises unintelligible language (e.g., gibberish), interactive agent server 150 requests the user 110 to send an intelligible acknowledgement. In some embodiments, if interactive agent server 150 determines that the received acknowledgement 188 comprises non-English language, interactive agent server 150 requests the user 110 to resend the acknowledgement 188 in English.

If interactive agent server 150 determines that the acknowledgement 188 does not contain profanity, unintelligible language, and/or non-English language, interactive agent server 150 sends a request for a service to an upstream server 170 (step 318). For example, interactive agent server 150 may send a request to RDBMS 174 requiring unlocking user account for user 110. In some embodiments, interactive agent server 150 may send a validation request to a third party server 176 (e.g., a validation server) asking the validation server to validate the identity of user 110 (step 316).

Upstream server 170 receives the service request from interactive agent server 150 and fulfills the requested service (step 320). For example, third party server 176 (e.g., a validation server) validates the identity of user 110, and RDBMS 174 unlocks the user account for user 110.

Upstream server 170 further updates the query status 190 to the user 110 (step 322). For example, upstream server 170 may send a notification to user 110 informing user that the user account has been unlocked for user 110.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skill in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for processing queries, comprising:
    an interactive agent server configured to support human-machine communication; and
    an upstream server communicatively coupled to the interactive agent server, the upstream server configured to provide service to the interactive agent server;
    wherein the interactive agent server comprises one or more processors, the one or more processors operable to:
        receive a first query from a first user, the first query comprising a message indicating a request for a service;
        perform natural language processing on the first query, wherein the natural language processing comprises segmenting words of the first query and performing semantic analysis on the first query;
        determine whether the first query comprises a misspelled word;
        in response to determining that the first query comprises the misspelled word, correct the misspelled word;
        identify keywords of the first query based on the natural language processing;
        determine an action and an actionable item from the first query based on the identified keywords, wherein the action comprises an operation, a procedure, or a process, wherein the actionable item comprises an item that is impacted by the action;
        generate an acknowledgement request, using the natural language processing, for the first query based on the determined action and actionable item, wherein the acknowledgement request comprises a request for the first user to acknowledge whether the first user is requesting the service, wherein the acknowledgement request comprises the determined action and actionable item;
        send the acknowledgement request to the first user;
        receive an acknowledgement on the acknowledgement request from the first user confirming that the first user has requested the service; and
        in response to receiving the acknowledgement, send the determined action and actionable item to the upstream server to fulfill the service.

2. The system of claim 1, wherein the upstream server is further configured to:
    fulfill the service request; and
    update a query status to the first user by notifying the first user that the service request has been fulfilled.

3. The system of claim 1, wherein performing natural language processing on the first query comprises:
    performing word correction on the message;
    identifying stop words in the message;
    determining negations in the message; and
    categorizing words in the message.

4. The system of claim 1, wherein the one or more processors are further operable to:
    determine whether the received acknowledgement comprises a profanity; and
    upon determining that the received acknowledgement comprises a profanity, notify the first user that the received acknowledgement is ignored because of profanity and that the first user is being monitored for profanity.

5. The system of claim 1, wherein the one or more processors are further operable to:
    determine whether the received acknowledgement comprises an unintelligible language; and
    upon determining that the first query comprises an unintelligible language, request the first user to send an intelligible acknowledgement.

6. The system of claim 1, wherein the one or more processors are further operable to:
    determine whether the received acknowledgement comprises a non-English language; and
    upon determining that the received acknowledgement comprises a non-English language, request the first user to send an acknowledgement in English.

7. The system of claim 1, wherein:
    the system further comprises a security events server communicatively coupled to the interactive agent server, the security events server comprising a memory to store a plurality of security events; and
    the one or more processors are further operable to:
        retrieve a security event from the security events server, the security event indicating that a second user attempted to perform a security-related action comprising resetting a password associated with the second user;
        generate a second acknowledgement request based on the security event, the second acknowledgement request requesting the second user to acknowledge that the second user has performed the security-related action;
        send the second acknowledgement request to the second user; and
        receive a second acknowledgment on the second acknowledgement request from the second user indicating that the second user acknowledges performing the security-related action.

8. The system of claim 7, wherein the security event comprises:
    a privacy event;
    an asset theft;
    a security incident report;
    an endpoint data loss prevention (eDLP) threat segregation; or
    a distributed denial of service (DDoS) attack.

9. A non-transitory computer-readable medium comprising logic for processing queries, the logic, when executed by a processor, operable to:
    receive a first query from a first user, the first query comprising a message indicating a request for a service;
    perform natural language processing on the first query, wherein the natural language processing comprises segmenting words of the first query and performing semantic analysis on the first query;
    determine whether the first query comprises a misspelled word;
    in response to determining that the first query comprises the misspelled word, correct the misspelled word;

identify keywords of the first query based on the natural language processing;
determine an action and an actionable item from the first query based on the identified keywords, wherein the action comprises an operation, a procedure, or a process, wherein the actionable item comprises an item that is impacted by the action;
generate an acknowledgement request, using the natural language processing, for the first query based on the determined action and actionable item, wherein the acknowledgement request comprises a request for the first user to acknowledge whether the first user is requesting the service, wherein the acknowledgement request comprises the determined action and actionable item;
send the acknowledgement request to the first user;
receive an acknowledgement on the acknowledgement request from the first user confirming that the first user has requested the service; and
in response to receiving the acknowledgement, send the determined action and actionable item to an upstream server to fulfill the service.

10. The non-transitory computer-readable medium of claim 9, wherein the logic, when executed by a processor, further operable to:
fulfill the service request; and
update a query status to the first user by notifying the first user that the service request has been fulfilled.

11. The non-transitory computer-readable medium of claim 9, wherein performing natural language processing on the first query comprises:
performing word correction on the message;
identifying stop words in the message;
determining negations in the message; and
categorizing words in the message.

12. The non-transitory computer-readable medium of claim 9, wherein the logic, when executed by a processor, further operable to:
determine whether the received acknowledgement comprises a profanity; and
upon determining that the received acknowledgement comprises a profanity, notify the first user that the received acknowledgement is ignored because of profanity and that the first user is being monitored for profanity.

13. The non-transitory computer-readable medium of claim 9, wherein the logic, when executed by a processor, further operable to:
determine whether the received acknowledgement comprises an unintelligible language; and
upon determining that the first query comprises an unintelligible language, request the first user to send an intelligible acknowledgement.

14. The non-transitory computer-readable medium of claim 9, wherein the logic, when executed by a processor, further operable to:
determine whether the received acknowledgement comprises a non-English language; and
upon determining that the received acknowledgement comprises a non-English language, request the first user to send an acknowledgement in English.

15. The non-transitory computer-readable medium of claim 9, wherein the logic, when executed by a processor, further operable to:
retrieve a security event, the security event indicating that a second user attempted to perform a security-related action comprising resetting a password associated with the second user;
generate a second acknowledgement request based on the security event, the second acknowledgement request requesting the second user to acknowledge that the second user has performed the security-related action;
send the second acknowledgement request to the second user; and
receive a second acknowledgment on the second acknowledgement request from the second user indicating that the second user acknowledges performing the security-related action.

16. A method for processing queries, comprising:
receiving a first query from a first user, the first query comprising a message indicating a request for a service;
performing natural language processing on the first query, wherein the natural language processing comprises segmenting words of the first query and performing semantic analysis on the first query;
determining whether the first query comprises a misspelled word;
in response to determining that the first query comprises the misspelled word, correcting the misspelled word;
identifying keywords of the first query based on the natural language processing;
determining an action and an actionable item from the first query based on the identified keywords, wherein the action comprises an operation, a procedure, or a process, wherein the actionable item comprises an item that is impacted by the action;
generating an acknowledgement request, using the natural language processing, for the first query based on the determined action and actionable item, wherein the acknowledgement request comprises a request for the first user to acknowledge whether the first user is requesting the service, wherein the acknowledgement request comprises the determined action and actionable item;
sending the acknowledgement request to the first user;
receiving an acknowledgement on the acknowledgement request from the first user confirming that the first user has requested the service; and
in response to receiving the acknowledgement, sending the determined action and actionable item to an upstream server to fulfill the service.

17. The method of claim 16, wherein the method further comprises:
determining whether the received acknowledgement comprises a profanity; and
upon determining that the received acknowledgement comprises a profanity, notifying the first user that the received acknowledgement is ignored because of profanity and that the first user is being monitored for profanity.

18. The method of claim 16, wherein the method further comprises:
determining whether the received acknowledgement comprises an unintelligible language; and
upon determining that the first query comprises an unintelligible language, requesting the first user to send an intelligible acknowledgement.

19. The method of claim 16, wherein the method further comprises:
determining whether the received acknowledgement comprises a non-English language; and upon determining that the received acknowledgement comprises a non-English language, requesting the first user to send an acknowledgement in English.

20. The method of claim 16, wherein the method further comprises:

retrieving a security event, the security event indicating that a second user attempted to perform a security-related action comprising resetting a password associated with the second user;

generating a second acknowledgement request based on the security event, the second acknowledgement request requesting the second user to acknowledge that the second user has performed the security-related action;

sending the second acknowledgement request to the second user; and receiving a second acknowledgment on the second acknowledgement request from the second user indicating that the second user acknowledges performing the security-related action.

\* \* \* \* \*